US012078312B2

(12) United States Patent
Brinkmeier et al.

(10) Patent No.: US 12,078,312 B2
(45) Date of Patent: Sep. 3, 2024

(54) LIGHTING ASSEMBLY FOR A LIGHTING DEVICE OF A MOTOR VEHICLE

(71) Applicant: Hella GmbH & Co. KGaA, Lippstadt (DE)

(72) Inventors: Frank Brinkmeier, Lippstadt (DE); Heinz-Michael Dirks, Lippstadt (DE); Miguel Lebrato-Rastrojo, Paderborn (DE); Frank Passgang, Lippstadt (DE); Timo Puls, Lippstadt (DE); Thomas Albert Röbbecke, Erwitte (DE); Frank Sohrweide, Lippstadt (DE); Christian Wieck, Lippstadt (DE); Thomas Wiese, Lippstadt (DE); Martin Wüller, Warendorf (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/936,220

(22) Filed: Sep. 28, 2022

(65) Prior Publication Data

US 2023/0017657 A1 Jan. 19, 2023

Related U.S. Application Data

(63) Continuation of application No. PCT/EP2020/061145, filed on Apr. 22, 2020.

(51) Int. Cl.
*F21S 41/29* (2018.01)
*F21S 41/19* (2018.01)
(Continued)

(52) U.S. Cl.
CPC ............... *F21S 41/29* (2018.01); *F21S 41/25* (2018.01); *F21S 45/47* (2018.01); *F21S 41/19* (2018.01);
(Continued)

(58) Field of Classification Search
CPC ...... F21V 5/008; F21V 17/101; F21V 17/104; F21V 17/16; F21V 17/164; F21V 17/04;
(Continued)

(56) References Cited

U.S. PATENT DOCUMENTS

2008/0151547 A1* 6/2008 Grotsch ................ F21V 29/763
257/E33.071
2016/0061402 A1* 3/2016 Kanayama .............. F21V 5/007
362/521
(Continued)

FOREIGN PATENT DOCUMENTS

DE 102004056252 A1 5/2006
DE 102012213841 A1 2/2014
FR 3049682 A1 * 10/2017

OTHER PUBLICATIONS

Machine translation of FR 3049682 A1 retrieved from the FIT database of PE2E search. (Year: 2023).*

*Primary Examiner* — Colin J Cattanach
(74) *Attorney, Agent, or Firm* — Husch Blackwell LLP

(57) ABSTRACT

A lighting assembly is provided for a lighting device of a motor vehicle. The lighting assembly includes an objective module with at least one objective lens mounted in a lens holder. The objective module also includes at least two first pins. The lighting assembly further includes a light source module with at least one light source mounted on a heat sink element, and with at least two first cavities. The objective module and the light source module are joined by adhesive joints between the first pins and the first cavities. The lens holder further includes the first pins, and/or the heat sink element comprises the first cavities.

18 Claims, 1 Drawing Sheet

(51) Int. Cl.

| | |
|---|---|
| ***F21S 41/25*** | (2018.01) |
| ***F21S 45/40*** | (2018.01) |
| ***F21S 45/47*** | (2018.01) |
| ***F21S 45/48*** | (2018.01) |
| ***F21S 45/49*** | (2018.01) |
| ***F21V 17/04*** | (2006.01) |
| ***F21V 17/06*** | (2006.01) |
| ***F21V 17/10*** | (2006.01) |
| ***F21V 17/16*** | (2006.01) |
| ***F21V 19/00*** | (2006.01) |

(52) U.S. Cl.
CPC ............ *F21S 41/192* (2018.01); *F21S 41/198* (2018.01); *F21S 41/295* (2018.01); *F21S 45/40* (2018.01); *F21S 45/48* (2018.01); *F21S 45/49* (2018.01); *F21V 17/04* (2013.01); *F21V 17/06* (2013.01); *F21V 17/101* (2013.01); *F21V 17/104* (2013.01); *F21V 17/16* (2013.01); *F21V 17/164* (2013.01); *F21V 19/003* (2013.01); *F21V 19/0035* (2013.01); *F21V 19/004* (2013.01); *F21V 19/0045* (2013.01); *F21V 19/005* (2013.01)

(58) Field of Classification Search
CPC .... F21V 17/06; F21V 19/003; F21V 19/0035; F21V 19/004; F21V 19/0045; F21V 19/005; F21L 15/02; G02B 7/025; F21S 45/40; F21S 45/47; F21S 45/48; F21S 45/49; F21S 41/20–275; F21S 41/29; F21S 41/19; F21S 41/192; F21S 45/198; F21S 45/42; F21S 45/43; F21S 45/435; F21S 45/46; F21S 45/465
See application file for complete search history.

(56) References Cited

U.S. PATENT DOCUMENTS

2016/0146423 A1* 5/2016 Lai .......................... F21S 41/19
362/520
2021/0222851 A1* 7/2021 Pirringer ............... F21S 41/322

* cited by examiner

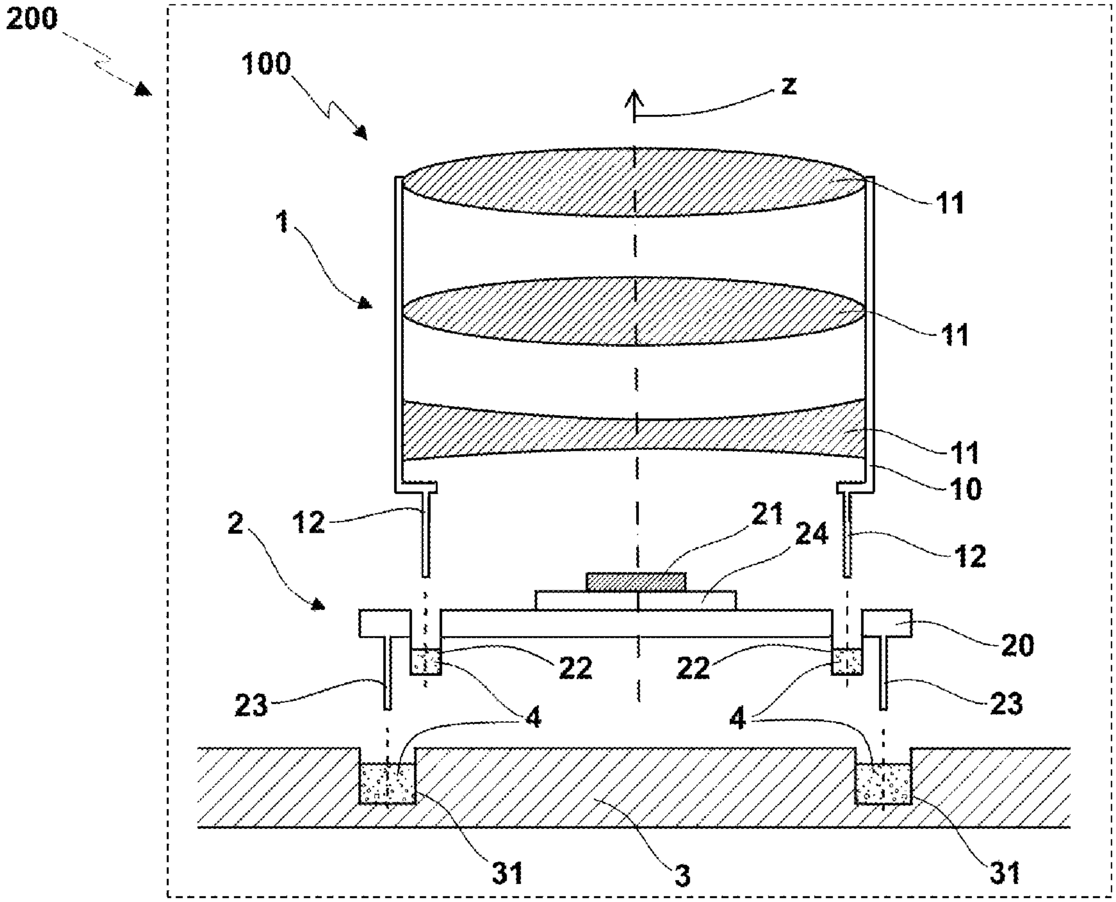
200
100
z
1
11
11
11
10
2
12
21
24
12
20
22
22
23
23
4
4
31
3
31

LIGHTING ASSEMBLY FOR A LIGHTING DEVICE OF A MOTOR VEHICLE

CROSS REFERENCE

This application claims priority to PCT Application No. PCT/EP2020/061145, filed Apr. 22, 2020, the entirety of which is hereby incorporated by reference.

FIELD OF THE INVENTION

The present invention relates to a lighting assembly for a lighting device of a motor vehicle, the lighting assembly comprising an objective module with at least one objective lens mounted in a lens holder and with at least two first pins extending from the back of the objective module, the lighting assembly further comprising a light source module with at least one light source mounted on a heat sink element and with at least two first cavities accessible from the front of the light source module, wherein the objective module and the light source module are joined by means of adhesive joints between the first pins and the first cavities. The invention further relates to a corresponding lighting device and a method of assembling and mounting the lighting assembly.

BACKGROUND OF THE INVENTION

A key challenge in assembling and mounting lighting assemblies for lighting devices of motor vehicles is the precise adjustment of light sources and optical components, e.g. objective lenses, relative to each other and relative to a common support frame. Especially, the position of the light cut-off line projected onto the road represents a key performance criterion of motor vehicle head lamps and is subject to strict regulations and customer specifications. In the prior art, active alignment of the various components in combination with adhesive joining is generally employed to meet the required standards. Active alignment means, that during assembling e.g. of an objective module with a light source module, the light source is operated and the resulting lighting effect is monitored. The target arrangement of the modules is then finally defined by the constitution of a desired target lighting effect. The fixation of the modules in their target arrangement is usually established by adhesive joints, especially by pin-cavity-type joints.

The document DE 10 2012 213 841 A1 discloses a lighting assembly comprising a light source module, a primary optic module and a segmented fastening unit, wherein the fastening unit is attached to the light source module and to the primary optic module by means of screw joints. The fastening unit comprises fastening means in the form of pins extending from the light source module and related cavities attached to the primary optic module. During assembling the lighting assembly, the cavities are filled with an adhesive and the pins are inserted into the cavities to fasten the modules in target arrangement by pin-cavity-type joints.

A number of drawbacks is associated with the use of a fastening unit according to the teaching of the DE 10 2012 213 841 A1. There is an increased number of components to be produced and assembled, namely the fastening means and the screws and threaded holes for attachment to the respective modules. The number of necessary components contributes to the tolerance chain and determines weight and size of the modules as well as time and effort for the assembly process. Furthermore, the need for drilling threaded holes into the modules for the screw joints with the fastening unit was identified as a potential source of contamination with dust or debris.

BRIEF SUMMARY OF THE INVENTION

It is an object of the present invention to provide an alternative embodiment of a lighting assembly for a lighting device of a motor vehicle, the lighting assembly comprising an objective module with at least one objective lens mounted in a lens holder and with at least two first pins, the lighting assembly further comprising a light source module with at least one light source mounted on a heat sink element and with at least two first, wherein the objective module and the light source module are joined by means of adhesive joints between the first pins and the first cavities.

The invention discloses the technical teaching that the lens holder comprises the first pins and/or the heat sink element comprises the first cavities.

The core of the invention lies in the integration of the fastening means, i.e. the pins and the cavities, into primary components of the modules. Besides serving as means to carry the objective lens or to dissipate waste heat from the light source, the lens holder and the heat sink element according to the invention thus furthermore feature the additional function as fastening means. Owing to this function integration, the inventive lighting assembly does not comprise the separate fastening unit known from the prior art. Therefore, a significant reduction in the number of components including several screws is achieved, which results in more efficient handling and logistics during assembling as well as in improved properties of the lighting assembly in terms of weight, dimensional tolerance and vibration characteristics.

As a preferred embodiment of the invention the lens holder and the first pins form a one-piece component of uniform material. Likewise, the heat sink element and the first cavities preferably form a one-piece component of uniform material. This allows for an effective production of the components and thus a convenient function integration.

Advantageously, the first pins extend from the back of the objective module and the first cavities are accessible from the front of the light source module. The front of each module corresponds to the respective light exit side and the back of the objective module corresponds to its light entrance side. The back of the objective module thus faces the front of the light source module in the lighting assembly. With the aforementioned arrangement of pins and cavities, the modules can be assembled by pushing them together along the optical axis and a straightforward adjustment is feasible.

According to another preferred embodiment, the inventive lighting assembly comprises at least a section of a support frame with at least two second cavities, and the heat sink element comprises at least two second pins, wherein the light source module and the support frame are joined by means of adhesive joints between the second pins and the second cavities. The support frame serves for mounting of the lighting assembly into a lighting device, wherein several lighting assemblies can be attached to one support frame in an exemplary embodiment. The adhesive joint between the light source module and the support frame is also established by a pin-cavity-type joint and again the fastening means, i.e. the second pins and the second cavities, are integral parts of primary components of the joining partners. The heat sink element in this embodiment thus comprises the first cavities as fastening means for the joint between the light source module and the objective module as well as the second pins as fastening means for the joint with the support frame. Especially, the heat sink element and the second pins form a one-piece component of uniform material.

Advantageously, the lens holder comprises a thermosetting polymer, and/or the heat sink element comprises an aluminum alloy. Thermosetting polymers, e.g. bulk molding compounds, exhibit appropriate thermo-mechanical properties for use in lighting devices of motor vehicles, i.e. high robustness and stiffness as well as a low thermal expansion coefficient.

Preferably, the lens holder is fabricated by means of injection molding, and/or the heat sink element is fabricated by means of die casting. These are established processes and offer suitable geometrical flexibility to form the parts with integrated pins and cavities.

The invention further concerns a lighting device for a motor vehicle comprising at least one lighting assembly according to one of the aforementioned embodiments.

Furthermore, the invention concerns a method of assembling a lighting assembly for a lighting device of a motor vehicle, the lighting assembly comprising an objective module with at least one objective lens mounted in a lens holder, a light source module with at least one light source mounted on a heat sink element, and a support frame, and wherein the method comprises at least the following steps: providing the lens holder with at least two first pins; providing the heat sink element with at least two first cavities and with at least two second pins; providing the support frame with at least two second cavities; positioning the objective module relative to the light source module; joining the objective module to the light source module by generating an adhesive joint between the first pins and the first cavities; positioning the light source module relative to the support frame, and joining the light source module to the support frame by generating an adhesive joint between the second pins and the second cavities.

Advantageously, during positioning the objective module and/or the light source module, the light source is operated and a lighting effect thereby generated is monitored, wherein a target arrangement of the objective module and/or the light source module is defined by constitution of a target lighting effect. This procedure corresponds to the active alignment known from the prior art. The formation of the joint between objective module and light source module can be performed in a first workplace and afterwards this pre-assembly is transferred to a second workplace in order to attach it to the support frame, which typically carries a multitude of light source modules.

Preferably, during positioning the objective module and/or the light source module, the objective module and/or the light source module are displaced along three translational axes and/or rotated around three rotational axes. Such six-axis alignment allows for a most precise positioning and convenient setting of the target arrangement.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a cross-sectional elevation view of an embodiment of a lighting device.

DETAILED DESCRIPTION OF THE DRAWINGS

FIG. 1 shows a cross-sectional sketch of a preferred embodiment of the lighting assembly 100 as part of the inventive lighting device 200. The lighting device 200 is depicted only schematically as an entity comprising the lighting assembly 100, while further components of the lighting device 200 like a housing, a front panel or further light-technical components are not included in FIG. 1.

The lighting assembly 100 is depicted in a partially exploded view with the objective module 1, the light source module 2 and the support frame 3 separated from each other along the optical axis z.

The objective module 1 comprises three lenses 11 mounted in the lens holder 10, e.g. by means of laser beam welding or adhesive bonding. The lens holder 10 exhibits the shape of a cylindrical hull surrounding the lenses 11. At the back of the lens holder 10, the first pins 12 extend towards the light source module 2. The first pins 12 and the remaining sections of the lens holder 10 form a one-piece component of uniform material, preferably fabricated from a bulk molding compound by means of bulk molding.

The light source module 2 comprises the light source 21, in this case a LED on a printed circuit board 24, mounted on the heat sink element 20. The heat sink element 20 comprises the first cavities 22 and the second pins 23, altogether forming a one-piece component of uniform material, preferably a die-cast part from an aluminum alloy. The first cavities 22 are accessible from the front of the light source module 2 and aligned for acceptance of the first pins 12 to establish adhesive joints of the pin-cavity-type between the objective module 1 and the light source module 2.

For assembling the lighting assembly 100, the first cavities get filled with an adhesive 4, e.g. an ultraviolet-light curable type, and during the positioning of the objective module 1, typically by means of an automated manipulator, the first pins 12 are received by the first cavities 22 and active alignment is deployed to find the target arrangement of the two modules 1 and 2 relative to each other. The dimensions of the first pins 12 and of the first cavities 22 are chosen to allow for a six-axis alignment of the modules 1 and 2, i.e. within a certain range the objective module 1 can be displaced along three translational axes and/or rotated around three rotational axes. After curing the adhesive 4, the objective module 1 and the light source module 2 are joint together in the target arrangement.

Likewise, an adhesive joint is established between the light source module 2 and the support frame 3 with the second pins 23 and the second cavities 31 filled with adhesive 4 serving as the fastening means.

In addition to the pins 12, 23 and cavities 22, 31 shown in the cross-sectional view of FIG. 1, further such fastening means are preferably present in the lighting assembly 100, e.g. distributed every 90° around the optical axis z.

The present invention is not limited by the embodiment described above, which is represented as an example only and can be modified in various ways within the scope of protection defined by the appending patent claims.

LIST OF NUMERALS

100 lighting assembly
200 lighting device
1 objective module
10 lens holder
11 lens
12 first pin
2 light source module
20 heat sink element
21 light source
22 first cavity

23 second pin
24 PCB
3 support frame
31 second cavity
4 adhesive
z optical axis

The invention claimed is:

1. A lighting assembly for a lighting device of a motor vehicle, the lighting assembly comprising:
an objective module having:
at least-one objective lens mounted in a lens holder, and
at least two first pins integrated with the lens holder as a one-piece component of uniform material; and
a light source module having:
at least one light source mounted on a heat sink element,
wherein the heat sink element comprises at least two first cavities, and at least two second pins integrated with the heat sink element as a one-piece component of uniform material;
wherein the objective module and the light source module are joined by adhesive joints between the first pins and the first cavities.

2. The lighting assembly according to claim 1, wherein at least one of:
the lens holder is fabricated by injection molding, and
the heat sink element is fabricated by die casting.

3. The lighting assembly according to claim 1, wherein the heat sink element and the first cavities form a one-piece component of uniform material.

4. The lighting assembly according to claim 1, wherein the first pins extend from a back of the objective module and the first cavities are accessible from a front of the light source module.

5. The lighting assembly according to claim 1, wherein the lighting assembly comprises at least a section of a support frame with at least two second cavities, wherein the light source module and the support frame are joined by adhesive joints between the second pins and the second cavities.

6. A lighting device for a motor vehicle comprising at least one lighting assembly according to claim 1.

7. The lighting assembly according to claim 1, wherein at least one of:
the lens holder comprises a thermosetting polymer, and
the heat sink element comprises an aluminum alloy.

8. A method of assembling a lighting assembly for a lighting device of a motor vehicle, the lighting assembly comprising an objective module with at least one objective lenses mounted in a lens holder, a light source module with at least one light source mounted on a heat sink element, and a support frame, and the method comprising the steps of:
providing the lens holder with at least two first pins integrated with the lens holder as a one-piece component of uniform material,
providing the heat sink element with at least two first cavities and with at least two second pins integrated with the heat sink element as a one-piece component of uniform material,
providing the support frame with at least two second cavities,
positioning the objective module relative to the light source module,
joining the objective module to the light source module by generating an adhesive joint between the first pins and the first cavities,
positioning the light source module relative to the support frame, and
joining the light source module to the support frame by generating an adhesive joint between the second pins and the second cavities, wherein a radial distance between the first pins and the light source is less than the radial distance between the second pins and the light source.

9. The method according to claim 8, wherein during positioning the objective module and/or the light source module, the light source is operated and a lighting effect thereby generated is monitored, wherein a target arrangement of the objective module and/or the light source module is defined by constitution of a target lighting effect.

10. The method according to claim 8, wherein during positioning the objective module and/or the light source module, the objective module and/or the light source module are displaced along three translational axes and/or rotated around three rotational axes.

11. A lighting assembly for a lighting device of a motor vehicle, the lighting assembly comprising:
an objective module having:
a lens mounted in a lens holder, and
a set of first pins, such that the lens holder and the first pins form a first one-piece uniform component;
a light source module having:
a light source mounted directly on a heat sink element, and
a set of first cavities, and
a set of second pins, such that the heat sink element and the set of second pins form
a second one-piece uniform component;
wherein the objective module and the light source module are joined by adhesive joints between the set of first pins and the set of first cavities.

12. The lighting assembly according to claim 11, further comprising:
a support frame having:
a set of second cavities,
wherein the heat sink element and the support frame are joined by non-threaded adhesive joints between the set of second pins and the set of second cavities.

13. The lighting assembly according to claim 11, wherein the first one-piece component including the lens holder and the set of first pins is of uniform material.

14. The lighting assembly according to claim 13, wherein the uniform material is a thermosetting polymer.

15. The lighting assembly according to claim 11, wherein the second one-piece component including the heat sink element and the set of second pins is of uniform material.

16. The lighting assembly according to claim 15, wherein the uniform material is an aluminum alloy.

17. The lighting assembly according to claim 11, wherein the set of first cavities and the set of second cavities are provided in a form of a non-threaded cavity.

18. The lighting assembly according to claim 11, wherein the set of first pins and the set of second pins are provided in a form of a non-threaded fastener.

* * * * *